(12) United States Patent
Masamura et al.

(10) Patent No.: US 12,444,031 B2
(45) Date of Patent: Oct. 14, 2025

(54) IMAGE PROCESSING APPARATUS, IMAGING APPARATUS, IMAGE PROCESSING METHOD, AND RECORDING MEDIUM BACKGROUND

(71) Applicant: CANON KABUSHIKI KAISHA, Tokyo (JP)

(72) Inventors: Takuya Masamura, Tokyo (JP); Pucheng Liu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 377 days.

(21) Appl. No.: 18/334,274

(22) Filed: Jun. 13, 2023

(65) Prior Publication Data
US 2023/0419459 A1    Dec. 28, 2023

(51) Int. Cl.
*G06T 5/80* (2024.01)
*G06T 5/50* (2006.01)
*H04N 23/63* (2023.01)

(52) U.S. Cl.
CPC ............... *G06T 5/80* (2024.01); *G06T 5/50* (2013.01); *H04N 23/631* (2023.01); *G06T 2207/20221* (2013.01)

(58) Field of Classification Search
CPC .. H04N 23/631; H04N 23/633; H04N 23/676; H04N 23/80; H04N 23/67; H04N 23/95; H04N 5/265; G06T 5/80; G06T 5/50; G06T 2207/20221; G06T 2207/10148
See application file for complete search history.

(56) References Cited

U.S. PATENT DOCUMENTS

| | | |
|---|---|---|
| 10,504,264 B1 * | 12/2019 | Koenig ................. G06T 11/001 |
| 10,928,622 B2 * | 2/2021 | Sugie ................... H04N 23/683 |
| 2015/0062384 A1 * | 3/2015 | Tanaka ...................... G06T 5/50 348/240.2 |
| 2018/0176475 A1 * | 6/2018 | Masamura ........... H04N 23/632 |
| 2018/0182075 A1 * | 6/2018 | Sasaki ....................... G06T 5/90 |
| 2021/0306550 A1 * | 9/2021 | Hoda ................... H04N 23/6812 |
| 2023/0209182 A1 * | 6/2023 | Keishiro ................. G06F 3/167 348/333.02 |
| 2024/0119565 A1 * | 4/2024 | Tsunashima ......... G06V 40/161 |

FOREIGN PATENT DOCUMENTS

JP    2008010970 A    1/2008

\* cited by examiner

*Primary Examiner* — Kelly L Jerabek
(74) *Attorney, Agent, or Firm* — Canon U.S.A., Inc. IP Division

(57) ABSTRACT

An apparatus includes a composition unit configured to perform composition on a plurality of images having different in-focus positions, a correction unit configured to perform correction on viewing angles of the plurality of images, and a display unit to configured to display the images of which the viewing angles have been corrected in a case where the correction unit performs the correction.

22 Claims, 14 Drawing Sheets

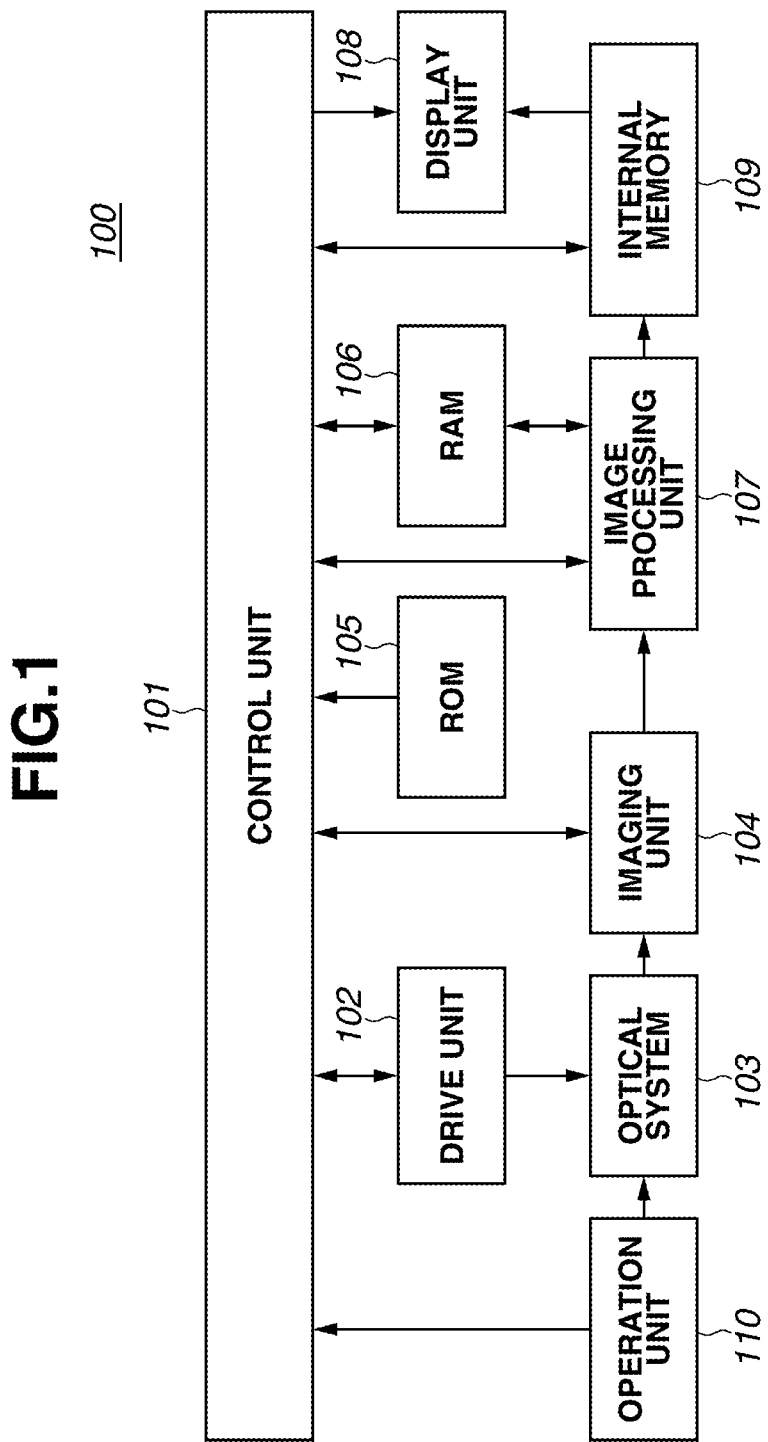

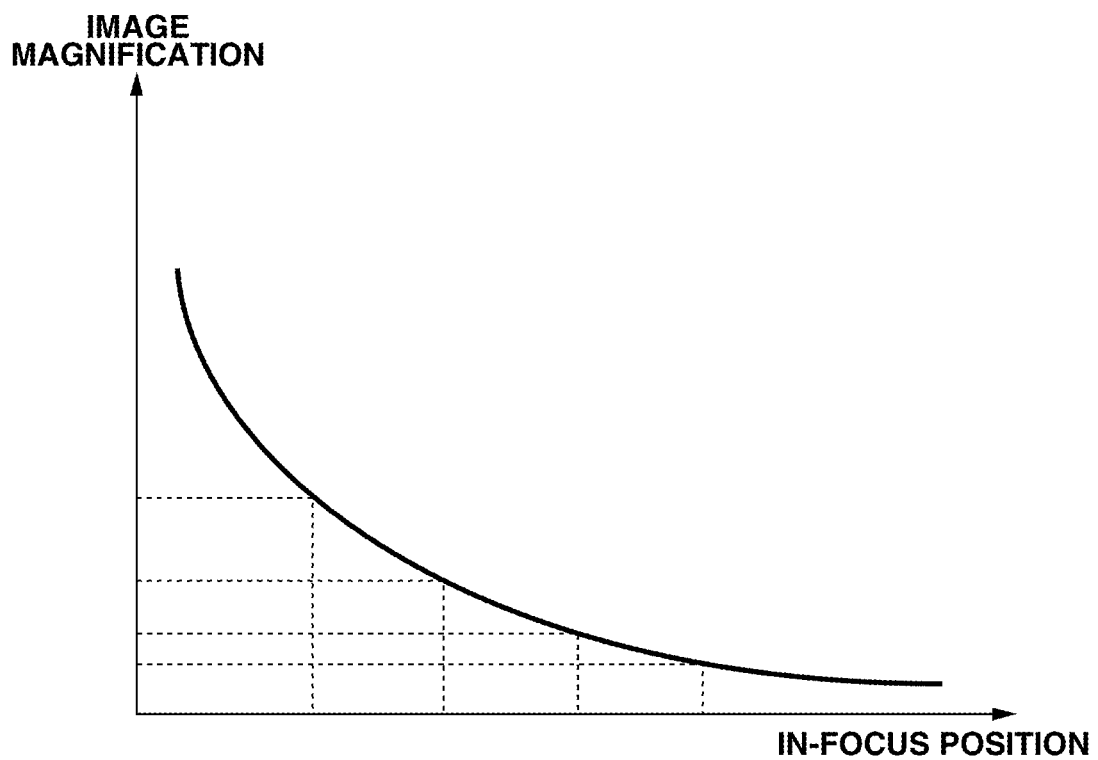

FIG.10
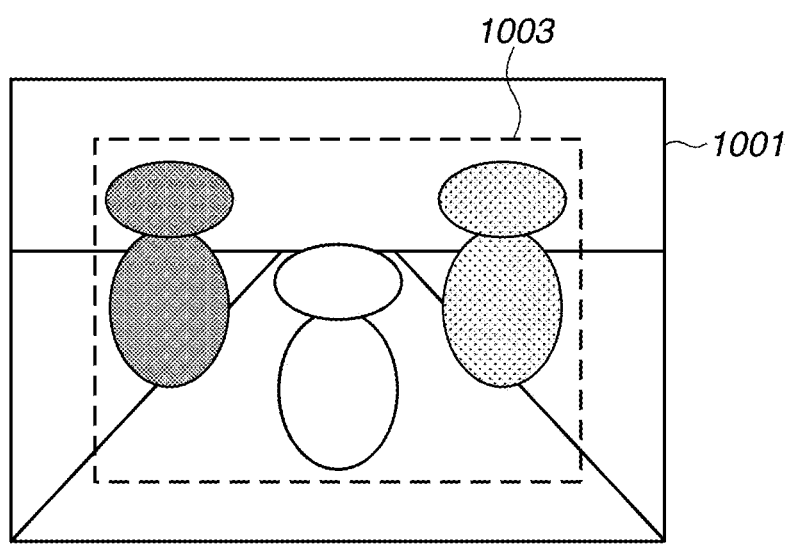
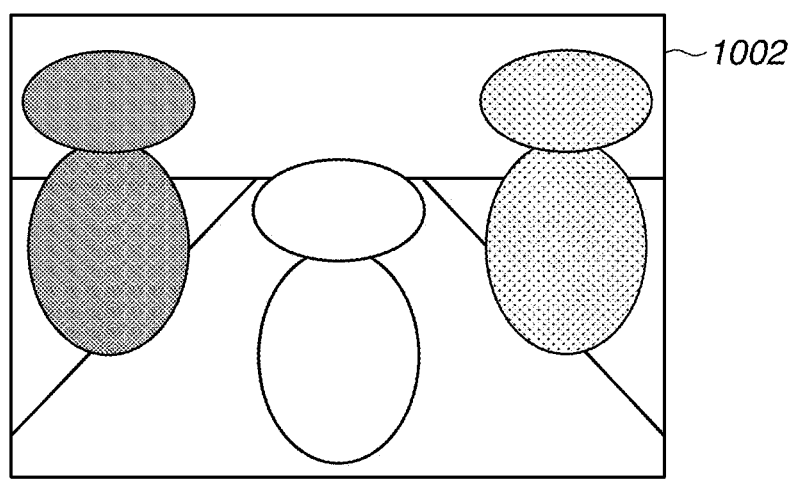

IMAGE PROCESSING APPARATUS, IMAGING APPARATUS, IMAGE PROCESSING METHOD, AND RECORDING MEDIUM BACKGROUND

TECHNICAL FIELD

The aspect of the embodiments relates to image processing apparatuses, and more particularly, to an image processing apparatus that displays a plurality of images having different in-focus positions.

DESCRIPTION OF THE RELATED ART

Japanese Patent Application Laid-Open No. 2008-10970 discloses what is called focus bracketing, a technique for capturing a plurality of images of a subject while varying the in-focus position to generate a plurality of images having different in-focus positions.

The focus bracketing technique, however, has an issue that the viewing angle changes between a plurality of captured images even if the plurality of images is captured with fixed settings other than the in-focus position.

SUMMARY

According to an aspect of the embodiments, an apparatus includes one or more processors, and a memory storing instructions which, when executed by the one or more processors, cause the image processing apparatus to function as a composition unit configured to perform composition on a plurality of images having different in-focus positions, a correction unit configured to perform correction on viewing angles of the plurality of images, and a display unit to configured to display the images of which the viewing angles have been corrected in a case where the correction unit performs the correction, wherein, in a case where the composition unit performs the composition, the correction unit performs the correction, and wherein, in a case where the composition unit does not perform the composition, the correction unit does not perform the correction.

Further features of the disclosure will become apparent from the following description of exemplary embodiments with reference to the attached drawings.

BRIEF DESCRIPTION OF THE DRAWINGS

FIG. 1 is a block diagram illustrating a configuration of a digital camera according to an exemplary embodiment.

FIG. 3 illustrates a function representing a relation between an in-focus position and an image magnification according to the exemplary.

FIG. 10 illustrates image clipping processing according to the exemplary embodiment.

DESCRIPTION OF THE EMBODIMENTS

Figure 2A:
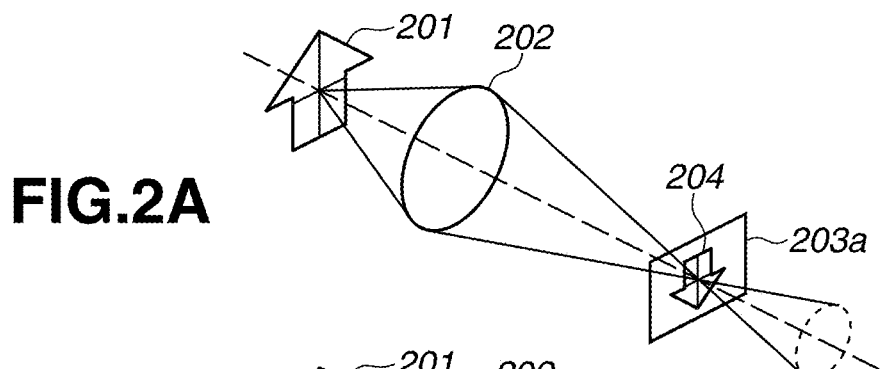
FIGS. 2A to 2D illustrate states where a subject image is formed on an imaging plane according to the exemplary embodiment.

Exemplary embodiments of the disclosure will be described in detail below with reference to the accompanying drawings.

Overview of Digital Camera

FIG. 1 illustrates an example of a block diagram illustrating a configuration of a digital camera for capturing images according to the exemplary embodiment. A digital camera 100 is capable of capturing still images, recording information about in-focus positions, and performing contrast value calculation and image composition. The digital camera 100 is capable of enlarging and reducing stored captured images and images input from the outside.

A control unit 101, a signal processor such as a Central Processing Unit (CPU) or Micro Processing Unit (MPU), controls each unit of the digital camera 100 while reading a program stored in a Read Only Memory (ROM) 105 (described below). For example, as discussed below, the control unit 101 issues instructions for starting and stopping image capturing to an imaging unit 104 (described below). The control unit 101 also issues image processing instructions based on the program stored in the ROM 105 to an image processing unit 107 (described below). Instructions from a user are input to the digital camera 100 via an operation unit 110 (described below) and reach each unit of the digital camera 100 via the control unit 101.

A drive unit 102 including a motor mechanically operates an optical system 103 (described below) under the instructions of the control unit 101. For example, under the instructions of the control unit 101, the drive unit 102 moves the position of the focusing lens included in the optical system 103 to adjust the focal length of the optical system 103.

The optical system 103 includes a zoom lens, a focusing lens, and a diaphragm. The diaphragm is a mechanism for adjusting the amount of transmitted light. The in-focus position can be changed by changing the lens positions.

The imaging unit 104 is a photoelectric conversion element for performing photoelectric conversion to convert an incident optical signal to an electrical signal. For example, a Charge Coupled Device (CCD) sensor or a Complementary Metal Oxide Semiconductor (CMOS) sensor is applicable to the imaging unit 104. The imaging unit 104 having a moving image capture mode can capture a plurality of time-continuous images as frames of a moving image.

The ROM 105, a read only nonvolatile memory as a recording medium, stores operation programs for different blocks in the digital camera 100 and parameters required for operations of these blocks. A Random Access Memory (RAM) 106, a rewritable volatile memory, is used as a temporary storage area for storing data output during operations of the blocks in the digital camera 100.

The image processing unit 107 subjects images output from the imaging unit 104 and image signal data recorded in an internal memory 109 (described below) to white balance adjustment, color interpolation, filtering, and other various image processing. The image processing unit 107 subjects image signal data captured by the imaging unit 104 to compression processing conforming to the Joint Photographic Experts Group (JPEG) standard.

The image processing unit 107 includes an Application Specific Integrated Circuit (ASIC) that integrates circuits for performing specific pieces of processing. Alternatively, the control unit 101 may also perform a part or whole of the functions of the image processing unit 107 by following the program read from the ROM 105. When the control unit 101 performs all of the functions of the image processing unit 107, the image processing unit 107 does not need to be provided as a hardware component.

The display unit 108 is a liquid crystal display (LCD) or an organic electroluminescence (EL) display for displaying images temporarily stored in the RAM 106, images stored in the internal memory 109 (described below), and setting screens of the digital camera 100.

The internal memory 109 is a location for recording images captured by the imaging unit 104, images having undergone the processing of the image processing unit 107, and information about in-focus positions during image capturing. A memory card is also applicable instead of the internal memory 109.

The operation unit 110 includes, for example, buttons, switches, keys, and mode dials on the digital camera 100, or a touch panel (also used as the display unit 108). Instructions from the user reach the control unit 101 via the operation unit 110.

DESCRIPTION OF SUBJECT IMAGE FORMING

Subject image forming will be briefly described below.

FIGS. 2A to 2D illustrate states where a subject image is formed on an imaging plane according to the exemplary embodiment.

FIG. 2A illustrates a state where the image of a subject 201 is formed as an image 204 on a plane 203a by an optical lens 202. More specifically, in a case where the plane 203a and the image sensor surface of the imaging unit 104 coincide with each other, the image of the subject 201 is formed as a "point" on the plane 203a and recorded as an in-focus image.

Figure 2B:
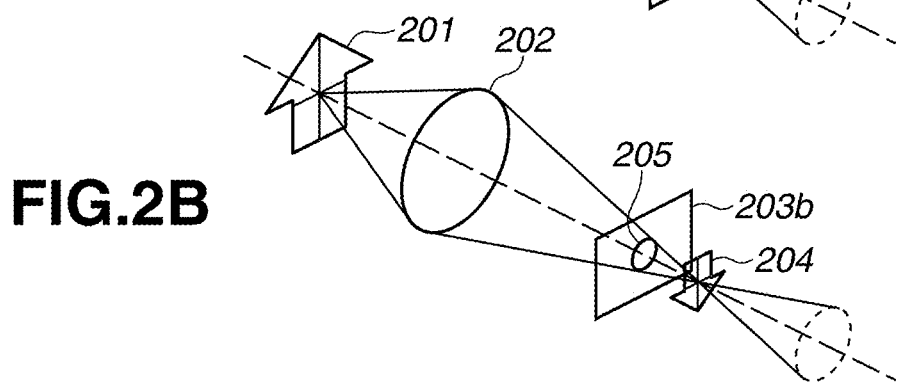

FIG. 2B illustrates a case where the imaging plane of the image and the image sensor surface do not coincide with each other. In a case where the position of an image sensor surface 203b is different from the position of the plane 203a illustrated in FIG. 2A, the image of the subject 201 formed by the optical lens 202 is reflected as a circle of confusion 205 on the image sensor surface 203b. In a case where the circle of confusion 205 is smaller than a permissible circle-of-confusion of the image sensor in the situation illustrated in FIG. 2B, the circle of confusion 205 can be regarded as equivalent to a "point" in an in-focus state, and an image equivalent to the in-focus image is obtained. On the other hand, in a case where the circle of confusion 205 is larger than the permissible circle-of-confusion, a defocused image is obtained on the image sensor surface 203b.

Figure 2C:
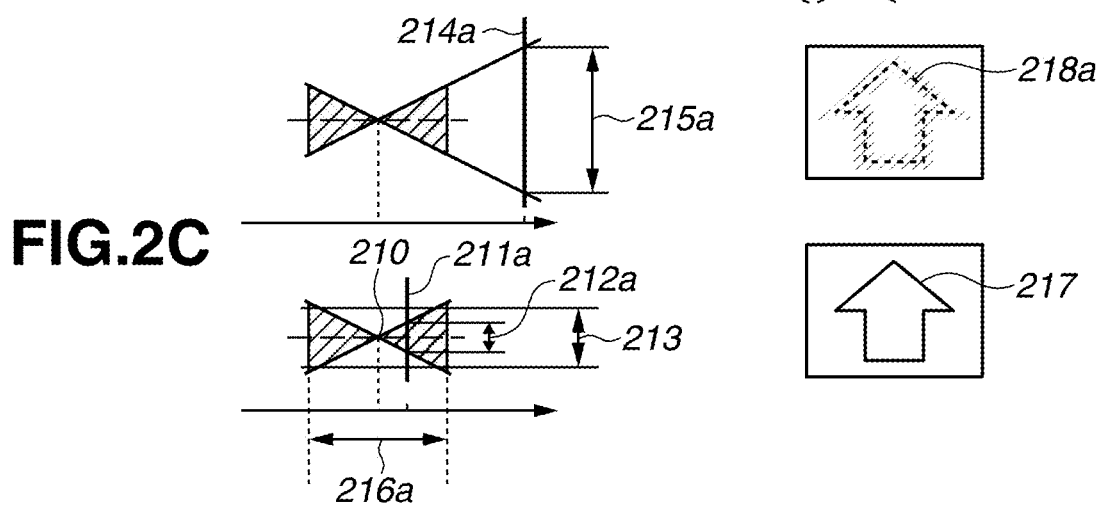

FIG. 2C illustrates the above-described state viewed from a lateral side. In a case where the subject image is formed at a focal point 210 and the image sensor surface is located at the position of a plane 211a, a circle-of-confusion diameter 212a is obtained. The circle-of-confusion diameter 212a illustrated in FIG. 2C is smaller than a permissible circle-of-confusion diameter 213 of the image sensor. Accordingly, an image 217 to be recorded by the image sensor is an in-focus image without out focus.

On the other hand, in a case where the image sensor surface is located at the position of a plane 214a, a circle-of-confusion diameter 215a is larger than the permissible circle-of-confusion diameter 213. Therefore, an image 218a on the image sensor surface is a defocused image. The shaded region where the circle-of-confusion diameter 212a is smaller than the permissible circle-of-confusion diameter 213 is a depth of focus 216a. The depth of focus 216a converted to a value on the subject side is the depth of field.

Figure 2D:
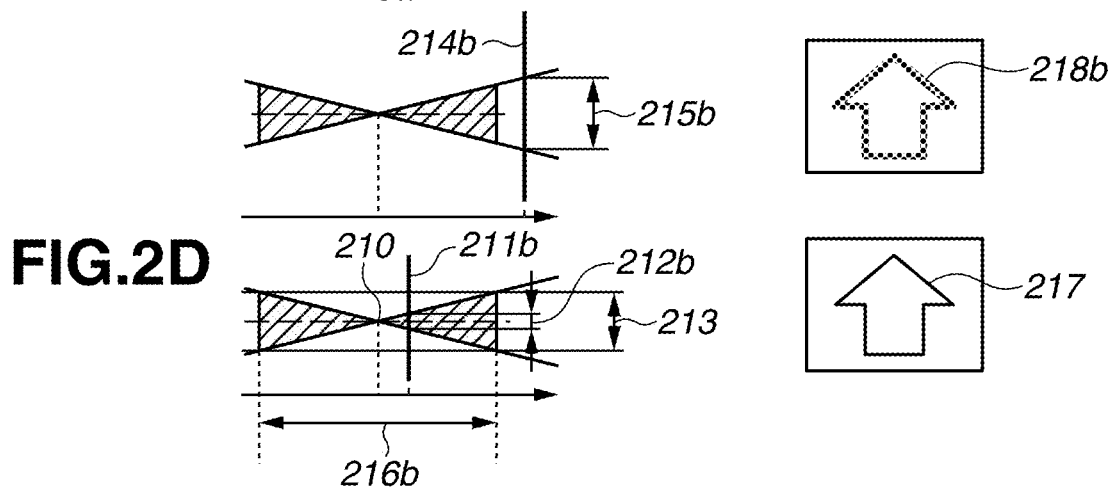

FIG. 2D illustrates a state where the diaphragm is closed more than that in the state in FIG. 2C. In a state where the diaphragm is closed, the diameter of incident light depends on the difference in depth. For example, a circle-of-confusion diameter 212b changes with a plane 211b, and a circle-of-confusion diameter 215b changes with a plane 214b. Since the circle-of-confusion diameter 215b in FIG. 2D is smaller than the circle-of-confusion diameter 215a in FIG. 2C, an image 218b in FIG. 2D has a smaller defocus amount than the image 218a in FIG. 2C. A depth of focus 216b in FIG. 2D is greater than the depth of focus 216a in FIG. 2C.

<Focus Breathing>

Focus breathing refers to a phenomenon in image capturing with a digital camera, in which the viewing angle changes with the movement of the focus ring, even without the movement of the zoom lens. Focus breathing is caused by the zooming action exhibited by the moving focus group. Particularly when an object at a short distance is focused, the actual focal length of the lens may largely change, and a phenomenon of focus breathing notably appears.

In capturing a plurality of images of a subject, changing the in-focus position may possibly change the viewing angle because of focus breathing even with fixed settings other than the in-focus position. In image capturing with the focus bracketing, changing the in-focus position may possibly differentiate the viewing angle between a plurality of captured images.

FIG. 3 illustrates a function representing the relation between the in-focus position and the image magnification according to the exemplary embodiment. With the function illustrated in FIG. 3, the image magnification monotonously decreases with respect to the in-focus position.

The relation between the in-focus position and the image magnification as illustrated in FIG. 3 depends on the lens type and can be obtained as lens-specific information in measurement. The relation between the in-focus position and the image magnification as illustrated in FIG. 3 also gives a relation between the in-focus position and the viewing angle. The image magnification in this case refers to the ratio of the size of the subject image formed on the image sensor to the size of the actual subject.

Descriptions of Depth Composition

Depth composition is an example of an application of the focus bracketing.

Figure 4:
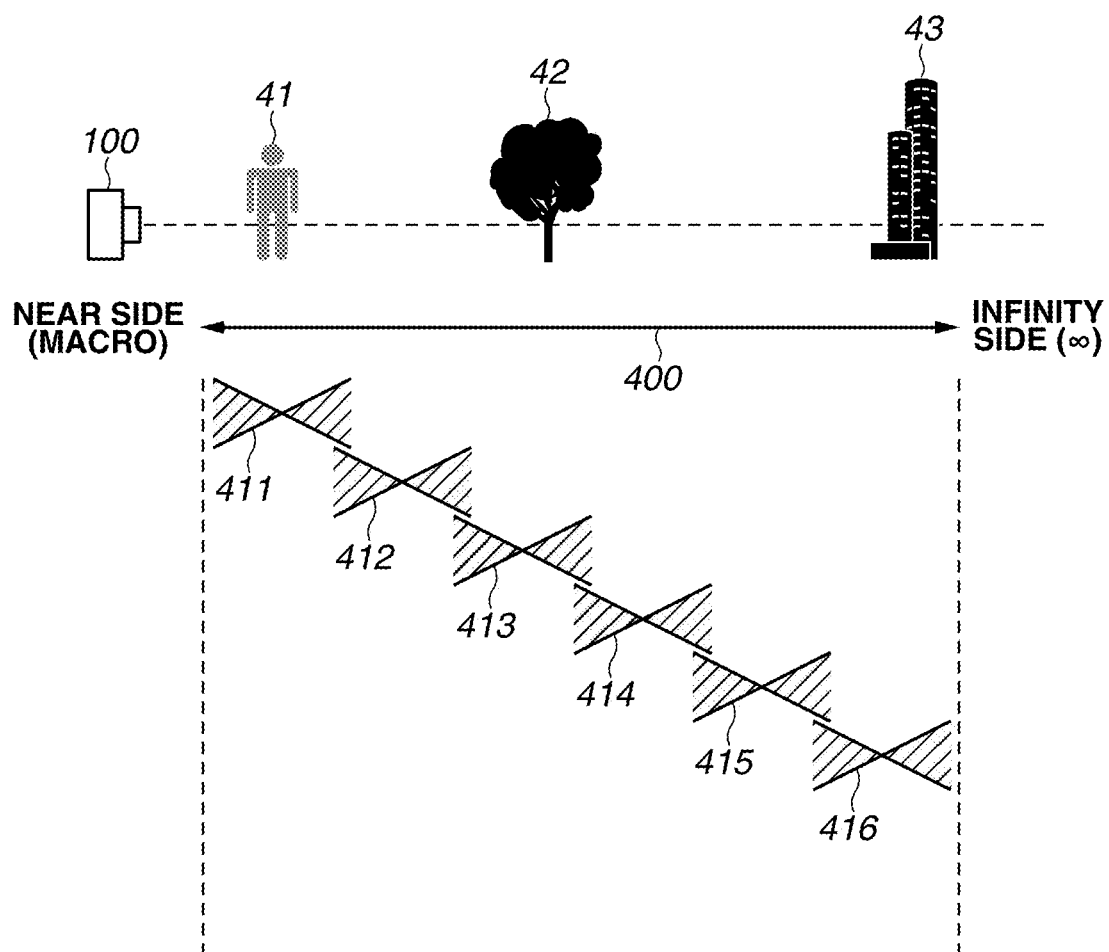
FIG. 4 illustrates image capturing for depth composition according to the exemplary embodiment.

FIG. 4 illustrates image capturing for depth composition according to the exemplary embodiment. Subjects 41 to 43 are assumed as subjects to be focused. The subjects 41 to 43 are located at different distances (subject distances), i.e., the subjects 41, 42, and 43 are positioned closer to the digital camera 100 in this order (in the direction from the short-distance side to the long-distance side). To obtain a depth-composition image with all of the plurality of subjects 41 to 43 in focus, a focal point range 400 subjected to the focus bracketing (bracketing range) needs to be covered at a plurality of focal depths. Depths of field 411 to 416 indicate the focal depths in image capturing at different positions, and are arranged to cover the focal point range 400. More specifically, by performing image capturing (six times) at different in-focus positions corresponding to the depths of field 411 to 416, each of the subjects 41 to 43 within the focal point range 400 is in focus in any one of the six images. By subjecting the regions in the focal depths in the plurality of images captured in this way to the image composition, an image in focus over the entire focal point range 400 (entire bracketing range) can be obtained.

The technique of depth composition is also useful for obtaining a high-resolution image. In a case where depths of field are small in capturing different images with the focus bracketing, an image region having an extremely high resolution can be obtained in the in-focus regions. Subjecting each of the in-focus regions to the image composition enables maintaining a feeling of a high resolution even in a composite image.

A processing flow for depth-composition image generation according to the exemplary embodiment will be described below.

Figure 5:
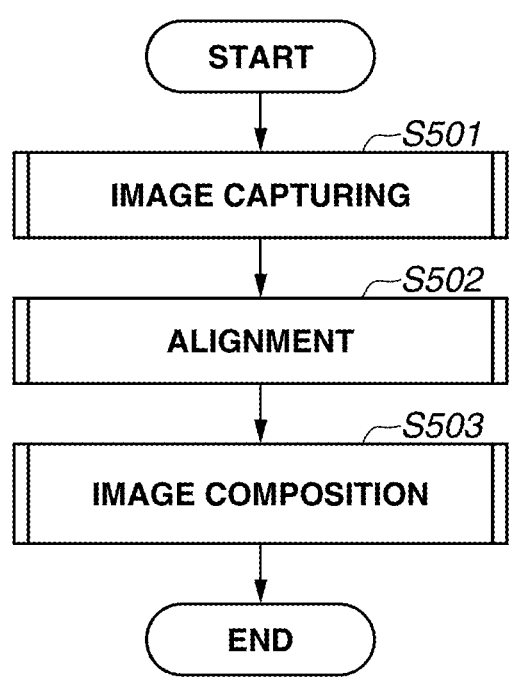
FIG. 5 is a flowchart illustrating composite image generation according to the exemplary embodiment.

FIG. 5 is a flowchart illustrating composite image generation according to the exemplary embodiment. In step S501, the imaging unit 104 captures a plurality of images having different in-focus positions in the optical axis direction. In step S502, the control unit 101 aligns the plurality of images captured by the imaging unit 104 in step S501. In step S503, the image processing unit 107 subjects the aligned images to the image composition to generate a composite image having a deeper depth of field.

Each step of the flowchart illustrated in FIG. 5 will be described in detail below.

Figure 6:
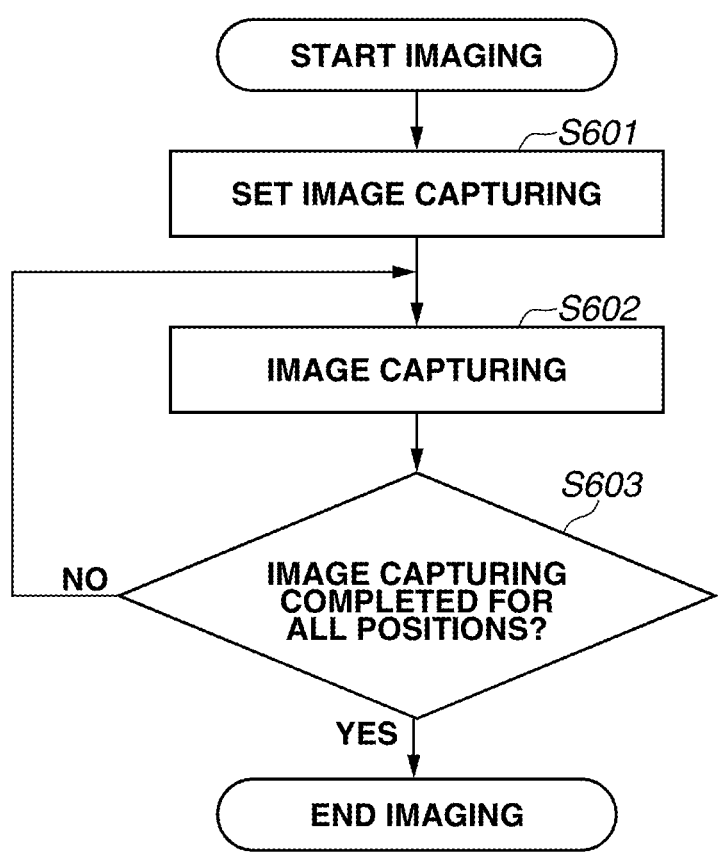
FIG. 6 is a flowchart illustrating image capturing according to the exemplary embodiment.

FIG. 6 is a flowchart illustrating image capturing in step S501 according to the exemplary embodiment.

In step S601, the control unit 101 sets image capturing. For example, the user specifies a position to be focused on the touch panel. Then, the control unit 101 recognizes the position specified by the user as the in-focus position on the nearest side, and sequentially identifies other in-focus positions corresponding to the predetermined number of images at predetermined focus intervals. The control unit 101 may recognize the position specified by the user, as the in-focus position on the most infinity side.

Alternatively, the control unit 101 may identify the first in-focus position by using automatic focusing via the optical system 103.

Alternatively, the user may specify two different positions on the touch panel, and the control unit 101 recognizes these positions specified by the user, as the in-focus positions on the most infinity side and on the nearest side.

In step S602, the imaging unit 104 performs image capturing at the in-focus position in the first order of image capturing where image capturing is not completed, out of the in-focus positions set in step S601.

In step S603, the control unit 101 determines whether image capturing is completed for all of the in-focus positions set in step S601. When image capturing is completed for all of the in-focus positions (YES in step S603), the processing in the flowchart illustrated in FIG. 6 ends. On the other hand, when image capturing is not completed for any in-focus position (NO in step S603), the processing returns to step S602.

With a multi-lens camera having a plurality of the imaging units 104, the control unit 101 may simultaneously perform image capturing at the plurality of in-focus positions set in step S601.

Figure 7:
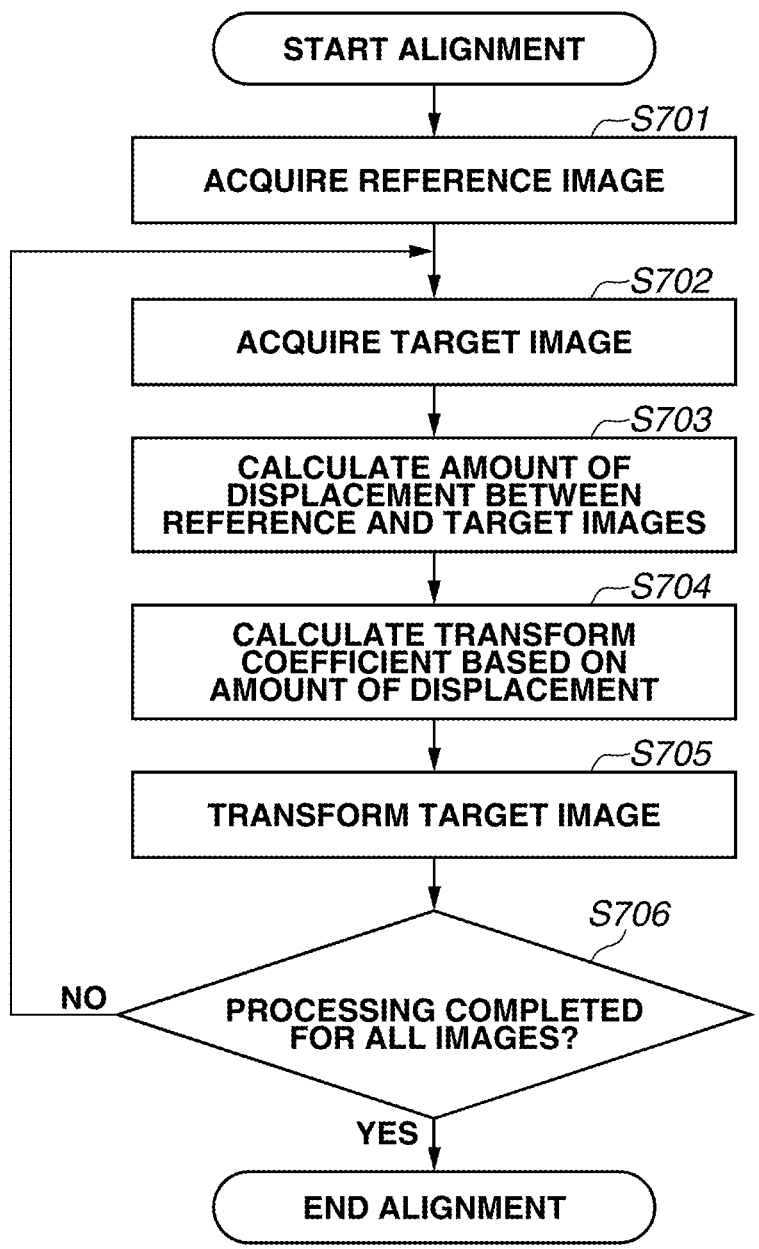
FIG. 7 is a flowchart illustrating alignment in depth composition according to the exemplary embodiment.

FIG. 7 is a flowchart illustrating the alignment in the depth composition according to the exemplary embodiment.

In step S701, the control unit 101 acquires a reference image for the alignment from among the images captured by the imaging unit 104 in step S501. The reference image for the alignment is, for example, the image captured first. Alternatively, the reference image may be the image having the narrowest viewing angle out of the captured images. This is because the viewing angle slightly changes between images captured while the in-focus position is varied.

In step S702, the control unit 101 acquires the images to be subjected to the alignment processing (target images). The target images are images other than the reference image acquired in step S701, not having been subjected to the alignment processing. If the image captured first is the reference image, the control unit 101 may sequentially acquire the target image in order of image capturing.

In step S703, the control unit 101 calculates the positional deviation between the reference image and each target image. An example of a calculation method will be described below. The control unit 101 sets a plurality of blocks to the reference image. In one embodiment, the set blocks have the same size. Then, the control unit 101 sets a range wider than each block of the reference image as a search range, at the same positions in the target images as the positions of the different blocks in the reference image. Lastly, the control unit 101 calculates a corresponding point in the search range of each target image, where Sum of Absolute Difference (hereinafter referred to as SAD) in luminance with each block of the reference image is minimized. The control unit 101 calculates the positional deviation calculated in step S703 as a vector, based on the center of each block and the above-described corresponding point in the reference image. In the calculation of the above-described corresponding point, the control unit 101 may use Sum of Squared Difference (hereinafter referred to as SSD) and Normalized Cross Correlation (hereinafter referred to as NCC) in addition to SAD.

In step S704, the control unit 101 calculates the transform coefficient based on the amount of positional deviation between the reference and the target images. The control unit 101 uses, for example, the projection transform coefficient as the transform coefficient. However, the transform coefficient is not limited to the projection transform coefficient. The affine transform coefficient and a simplified transform coefficient with horizontal and vertical shifts are also applicable.

In step S705, the image processing unit 107 converts the target image by using the transform coefficient calculated in step S704.

For example, the control unit 101 can perform the conversion by using Formula (1).

$$I' = \begin{pmatrix} x' \\ y' \\ 1 \end{pmatrix} = AI = \begin{pmatrix} a & b & c \\ d & e & f \\ g & h & i \end{pmatrix} \begin{pmatrix} x \\ y \\ 1 \end{pmatrix} \quad \text{(Formula 1)}$$

In Formula (1), (x', y') denotes the coordinates after the conversion, and (x,y) denotes the coordinates before the conversion. A matrix A represents the transform coefficient calculated by the control unit 101 in step S704.

In step S706, the control unit 101 determines whether the alignment is completed for all of the images other than the reference image. In a case where the alignment is completed for all of the images other than the reference image (YES in step S706), the processing in the flowchart illustrated in FIG. 7 ends. On the other hand, in a case where the alignment is not completed for all images (NO in step S706), the processing returns to step S702.

In a case where aligning a plurality of images captured by the above-described multi-lens camera, the control unit 101 can obtain the parallax amount caused by the positional deviation of the optical system 103 by calculating the amount of deviation in step S703. Accordingly, the control unit 101 can perform the alignment through similar processing.

Figure 8:
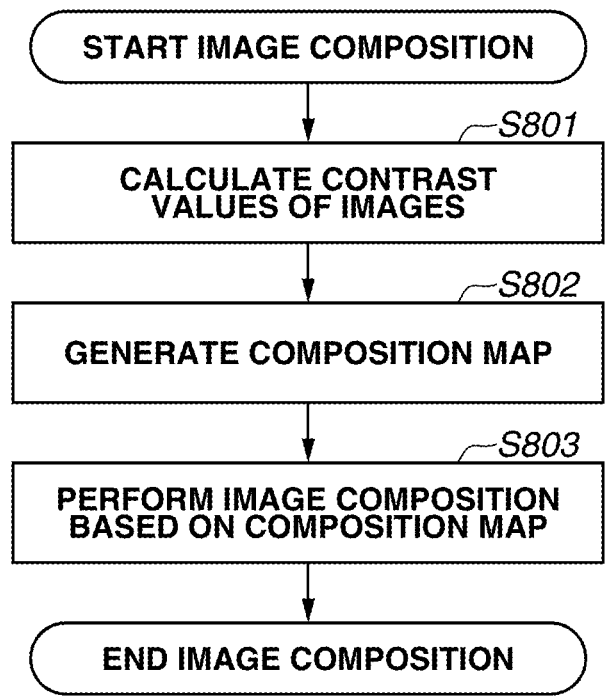
FIG. 8 is a flowchart illustrating depth-composition image generation according to the exemplary embodiment.

FIG. 8 is a flowchart illustrating depth-composition image generation according to the exemplary embodiment.

In step S801, the image processing unit 107 calculates contrast values for the different images (including the reference image) after the alignment. In an example of a contrast value calculation method, the image processing unit 107 calculates the luminance Y based on color signals Sr, Sg, and Sb for each pixel by using Formula (2).

$$Y = 0.299Sr + 0.587Sg + 0.114Sb \quad \text{Formula (2)}$$

Then, the image processing unit 107 calculates a contrast value I based on a Sobel filter. More specifically, the image processing unit 107 applies two different coefficients to the 3×3 pixel matrix L of the luminance Y, as represented by Formulas (3) to (5).

$$I_h = \begin{pmatrix} -1 & 0 & 1 \\ -2 & 0 & 2 \\ -1 & 0 & 1 \end{pmatrix} \cdot L \quad \text{(Formula 3)}$$

$$I_v = \begin{pmatrix} -1 & -2 & -1 \\ 0 & 0 & 0 \\ 1 & 2 & 1 \end{pmatrix} \cdot L \quad \text{(Formula 4)}$$

$$I = \sqrt{I_h^2 + I_v^2} \quad \text{(Formula 5)}$$

The above-described contrast value calculation method is to be considered as illustrative. For example, an edge detection filter such as a Laplacian filter or a band-pass filter allowing signal passage through a predetermined band is also applicable.

In step S802, the image processing unit 107 generates a composition map. As an example of a composition map generation method, the image processing unit 107 compares the contrast values of pixels at the same positions in different images, and calculates the composition ratio according to the magnitudes of the contrast values. More specifically, out of images at the same positions, the image processing unit 107 gives the 100% composition ratio to the pixel having the largest contrast value, and gives the 0% composition ratio to other pixels at the same positions. This condition is represented by Formula (6).

$$A_m(x, y) = \max_{k=1} C_k(x, y) \quad \text{(Formula 6)}$$

Referring to Formula (6), Cm(x,y) represents the contrast value calculated in step S801, and Am (x,y) represents the composition ratio of the composition map. m denotes the m-th image out of the plurality of images having different in-focus positions. x denotes the horizontal coordinate value of the image, and y denotes the vertical coordinate value of the image.

In step S802, it is necessary to suitably adjust the composition ratio so that boundary portions do not become unnatural. As a result, the composition ratio of the composition map in one image is not a binary value (0% and 100%) but a continuously changing value.

In step S803, the image processing unit 107 subjects the images after the alignment to the composition processing, by using the composition map generated in step S802, to generate a composite image.

<Viewing Angle of Depth-Composition Image>

In the above-described depth composition, the composite image obtained in step S803 may have a narrower viewing angle than the images captured in step S602 because of the above-described focus breathing. With the plurality of images captured by the imaging unit 104 in step S602, the changed in-focus position may possibly change the viewing angle. More specifically, the plurality of images captured by the imaging unit 104 in step S602 has different viewing angles. When generating a composite image based on the plurality of images captured by the imaging unit 104 in step S602, the image processing unit 107 needs to determine the viewing angle of the composite image according to the viewing angle of the image having the narrowest viewing angle. Accordingly, the viewing angle of the composite image coincides with the viewing angle of the image having the narrowest viewing angle among the plurality of images captured by the imaging unit 104 in step S602. In other words, the viewing angles of images other than the image having the narrowest viewing angle are different from the viewing angle of the composite image.

As described above, the difference between the viewing angles of the captured images and the viewing angle of the composite image may give the user an unnatural feeling. For example, when the user performs the focus bracketing by performing image capturing with the decreasing viewing angle, the viewing angle initially viewed on the display unit 108 by the user is different from the viewing angle of the image obtained in the image composition.

Therefore, the image processing unit 107 may subject the plurality of images captured with the focus bracketing to viewing angle correction according to the viewing angle of the image having the narrowest viewing angle. However, if the depth composition processing is not to be performed, the viewing angle correction is not required.

According to the exemplary embodiment, the control unit 101 determines whether to correct the viewing angles of the images to be captured with the focus bracketing, based on whether to perform the depth composition processing.

Figure 9:
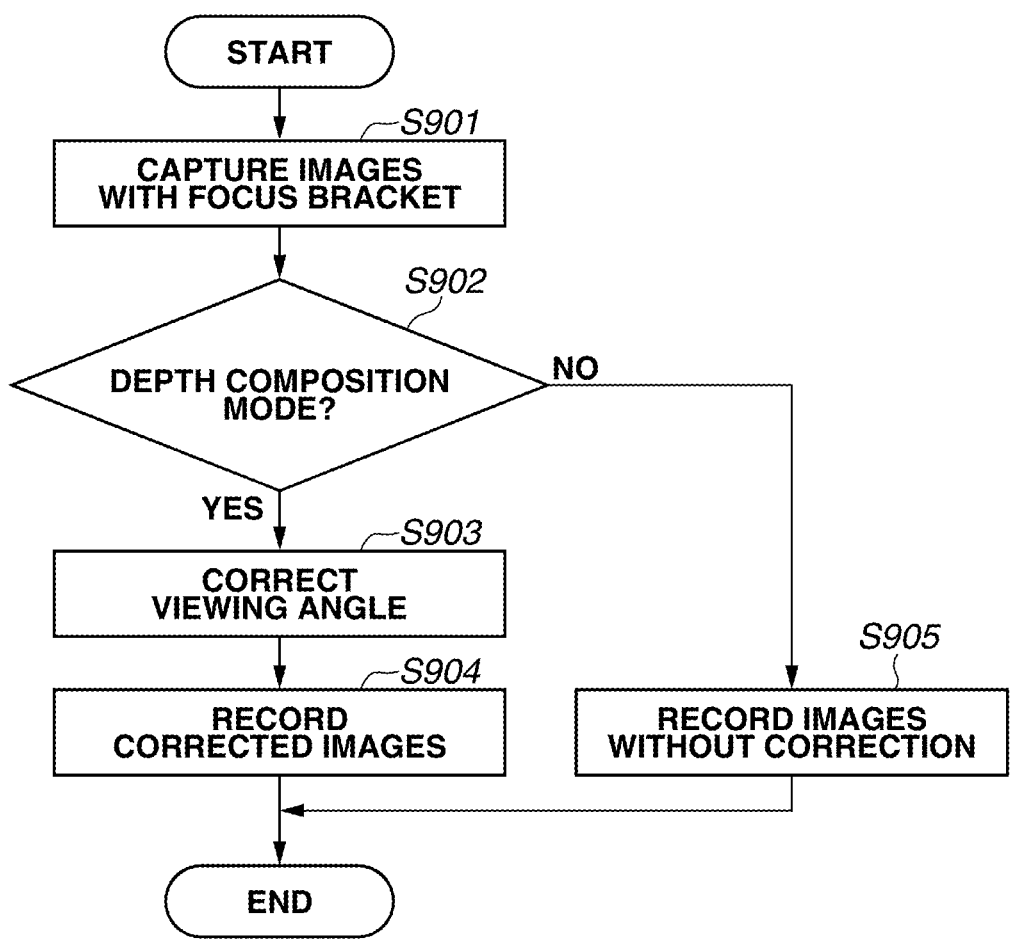
FIG. 9 is a flowchart illustrating viewing angle correction according to the exemplary embodiment.

FIG. 9 is a flowchart illustrating the viewing angle correction according to the exemplary embodiment.

In step S901, the imaging unit 104 performs the focus bracketing. The processing in step S901 may be assumed to be identical to the relevant processing of the flowchart illustrated in FIG. 6. The imaging unit 104 captures a plurality of images at a plurality of different predetermined in-focus positions.

In step S902, the control unit 101 determines whether the current mode is the depth composition mode.

The control unit 101 determines whether the current mode is the depth composition mode based on whether the depth composition as a function of the digital camera 100 is active. For example, in a case where the digital camera 100 has a normal continuous shooting mode in addition to the depth composition mode, the control unit 101 determines that not the normal continuous shooting mode but the depth composition mode is selected.

In a case where the depth composition mode is selected (YES in step S902), the processing proceeds to step S903. In step S903, the image processing unit 107 performs the viewing angle correction.

Examples of methods for correcting the viewing angle in step S903 includes a method in which the image processing unit 107 performs clipping processing on images other than the image having the narrowest viewing angle among the plurality of images.

FIG. 10 illustrates the image clipping processing according to the exemplary embodiment. Images 1001 and 1002 are assumed to be two different images captured with the focus bracketing. The image 1002 is assumed to be the image having the narrowest viewing angle among images captured with the focus bracketing. The image processing unit 107 is assumed to perform the image clipping processing with reference to the viewing angle of the image 1002. The image processing unit 107 clips a portion 1003 in the image 1001 equivalent to the viewing angle of the image 1002. The image processing unit 107 performs similar processing on all of images other than the image 1002 captured with the focus bracketing. As a result, all of images captured with the focus bracketing have the same viewing angle.

The image processing unit 107 may perform the viewing angle correction based on the relation between the in-focus position and the viewing angle, without actually comparing the viewing angles of the captured images. As described above, there is a specific relation illustrated in FIG. 3 between the in-focus position and the image magnification. Because a certain relation is recognized between the image magnification and the viewing angle, the relation between the viewing angle and the in-focus position is also obtained as specific lens information. The image processing unit 107 can acquire the relation between the viewing angle and the in-focus position as specific lens information, and acquire relative relations between the viewing angles of the plurality of images captured with the focus bracketing, by using the in-focus position of the focus bracketing. More specifically, the image processing unit 107 can correct the viewing angle of the correction target image in a case where there is information about the in-focus positions of the reference image and the correction target image.

Figure 11A:
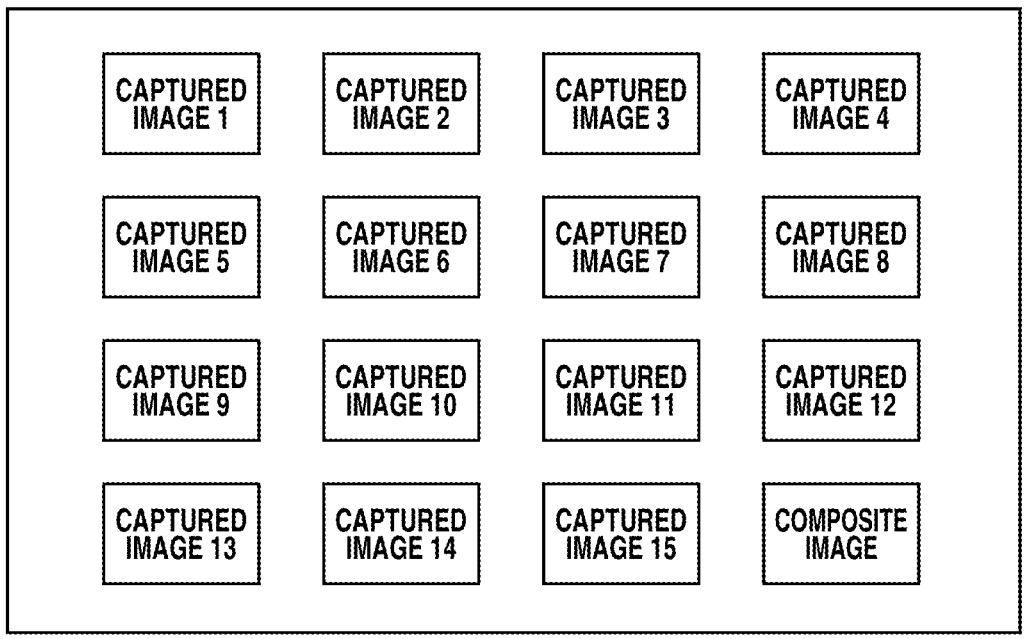
FIGS. 11A and 11B illustrate image display according to the exemplary embodiment.
Figure 11B:
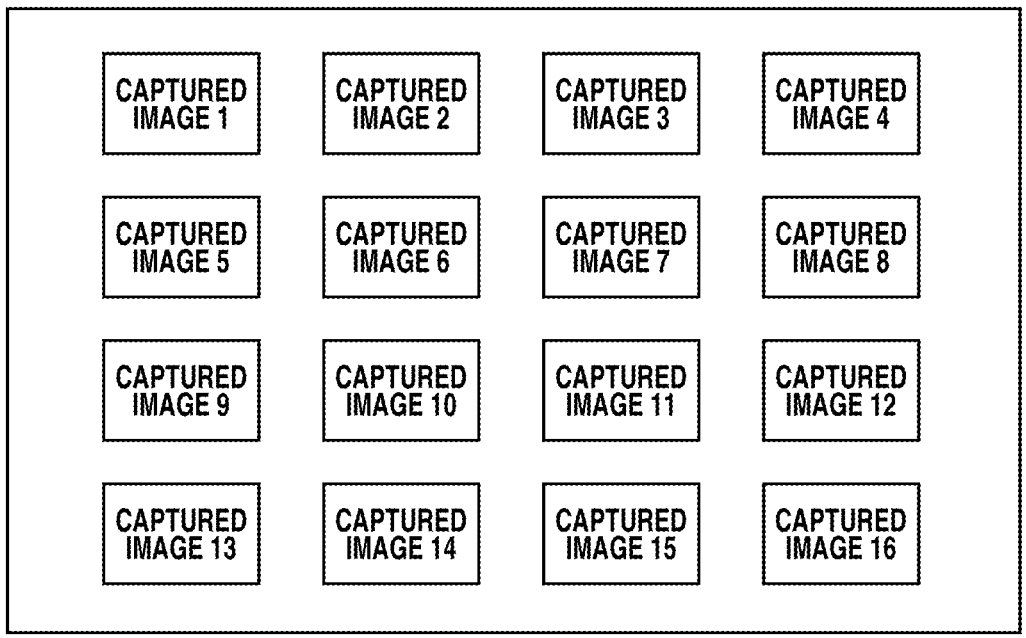

FIGS. 11A and 11B illustrate image display according to the exemplary embodiment. FIG. 11A illustrates the display of the display unit 108 in a case where a depth-composition image is generated. FIG. 11A illustrates a state where images (captured images) used for depth-composition image generation and a composite image are displayed at the same time. In a case where the image processing unit 107 corrects the viewing angles of the images to be displayed on the display unit 108, the viewing angles of the images to be displayed on the display unit 108 are unified.

FIG. 11B illustrates a state where the display unit 108 displays captured images without displaying the depth-composition image. Even in the case in FIG. 11B, the image processing unit 107 can correct the viewing angles of the images to be displayed on the display unit 108 to equalize their viewing angles.

Figure 12A:
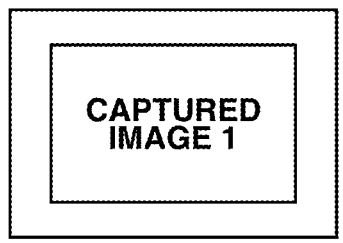
FIGS. 12A to 12D illustrate another image display according to the exemplary embodiment.
Figure 12B:
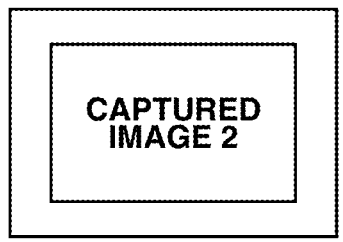
Figure 12C:
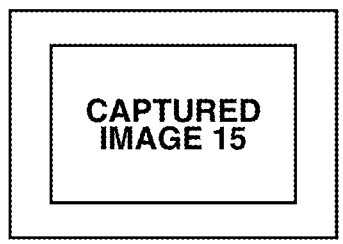
Figure 12D:
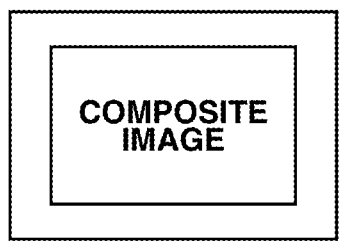

FIGS. 12A to 12D illustrate image display according to the exemplary embodiment. FIG. 12A illustrates a state where a captured image 1 is displayed on the display unit 108. FIG. 12B illustrates a state where a captured image 2 is displayed on the display unit 108. FIG. 12C illustrates a state where a captured image 15 is displayed on the display unit 108. FIG. 12D illustrates a state where a composite image is displayed on the display unit 108.

The user operates the keys or the touch panel provided on the operation unit 110 to select the captured image 1 in the screen illustrated in FIG. 11A, and the screen on the display unit 108 is changed to the screen illustrated in FIG. 12A. Likewise, the user operates the operation unit 110 to select the captured image 2 in the screen illustrated in FIG. 11A, and the screen on the display unit 108 is changed to the screen illustrated in FIG. 12B. The user operates the operation unit 110 to select the captured image 15 in the screen illustrated in FIG. 11A, and the screen on the display unit 108 is changed to the screen illustrated in FIG. 12C.

As illustrated in FIGS. 12A to 12D, the display unit 108 may change its display from one image display to another image display. For example, the display unit 108 displays the captured image 1 as illustrated in FIG. 12A. The user operates the keys provided on the operation unit 110 to change the image displayed on the screen to the captured image 2 as illustrated in FIG. 12B. The user further operates the operation unit 110 to enable sequentially displaying the captured images on the display unit 108. In a case where the display unit 108 displays all of the captured images and the user further operates the operation unit 110, the display unit 108 displays the composite image.

The numbers of captured images illustrated in FIGS. 11A, 11B, and 12A to 12D are to be considered just as examples.

In a case where the image processing unit 107 does not correct the viewing angles of the captured images, the viewing angles of the captured images appear to be changing while the display unit 108 is sequentially displaying the captured images. In a case where the image processing unit 107 corrects the viewing angles of the captured images, the viewing angles of the captured images appear to be unchanged while the display unit 108 is sequentially displaying the captured images. The user views the differences between the images due to the different in-focus positions, in a more notable way.

The user may select the images to be displayed on the display unit 108 by using a different method.

Figure 13:
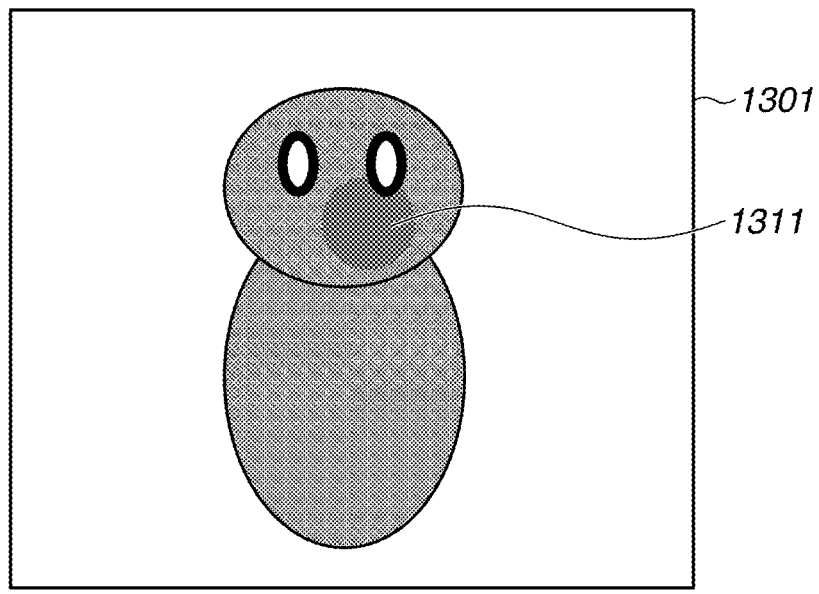
FIG. 13 illustrates an example of display on a display unit of the digital camera according to the exemplary embodiment.

For example, it is assumed that the plurality of images captured with the focus bracketing is recorded in the internal memory 109 of the digital camera 100 and that the touch panel (also used as the display unit 108 of the digital camera 100) functions as the operation unit 110. FIG. 13 illustrates an example of display on the display unit 108 of the digital camera 100 according to the exemplary embodiment. FIG. 13 illustrates a state where the display unit 108 displays any one image of the plurality of images captured with the focus bracketing. When the user touches an area 1311 on the touch panel (also used as the display unit 108), the display unit 108 displays the image in which the area 1311 is in the highest in-focus state among the plurality of images captured with the focus bracketing.

In this way, the digital camera 100 can quickly display images in which the region specified by the user is in focus.

The above-described image display switching method is implemented by recording information about in-focus positions of images, together with the images, in the internal memory 109. Alternatively, the image display switching can be implemented by the method to be described below.

Figure 14:
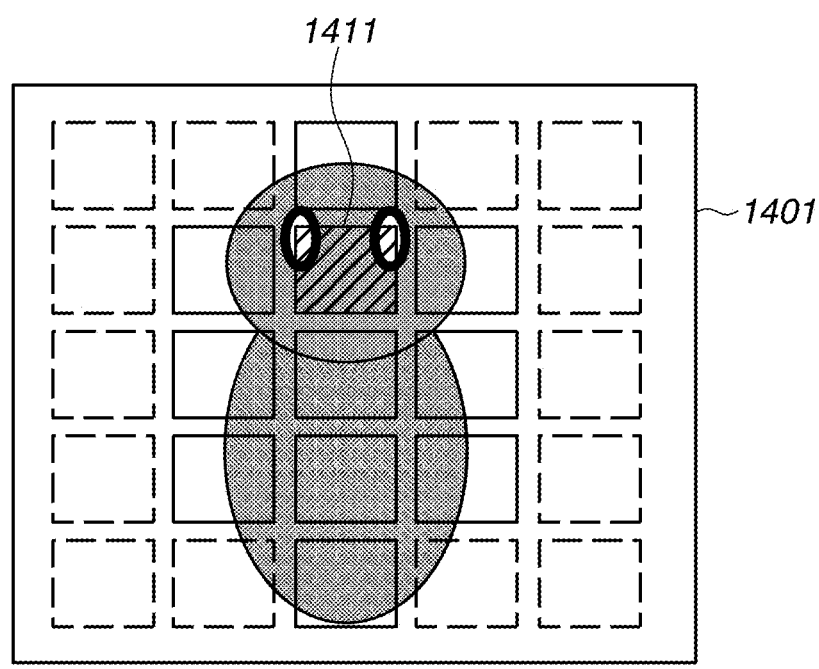
FIG. 14 illustrates an example of switching an image according to the exemplary embodiment.

FIG. 14 illustrates an example of image switching according to the exemplary embodiment.

Like an image 1301 illustrated in FIG. 13, an image 1401 illustrated in FIG. 14 is any one of the plurality of images captured with the focus bracketing. The image 1401 is divided into a plurality of blocks for processing (described below). FIG. 14 illustrates division blocks for the convenience of explanation. Actual division blocks are farther finer than those illustrated in FIG. 14. When the user touches the position equivalent to the area 1311, the control unit 101 identifies a shaded block 1411 equivalent to the area 1311 touched by the user. Then, the image processing unit 107 calculates contrast values based on a plurality of blocks equivalent to the block 1411 in all of the images captured with the focus bracketing.

Contrast values may be calculated based on the method described in Formulas (2) to (5). The control unit 101 assumes that the block having the highest contract value among the plurality of blocks equivalent to the block 1411 is in focus. Then, the display unit 108 displays captured images having the in-focus block.

The use of the above-described method also enables the display unit 108 to quickly display the images in which the position touched by the user is in the highest in-focus state.

Operations equivalent to the above-described touch operations on the touch panel performed by the user can be implemented with the buttons and keys provided on the operation unit 110 of the digital camera 100 without a touch panel. For example, the display unit 108 displays blocks as illustrated in FIG. 14, the user sequentially selects blocks to be focused by using buttons and keys and selects an application button, and the display unit 108 displays the image corresponding to the block to be focused.

When the plurality of captured images having different in-focus positions is to be displayed, the exemplary embodiment enables determining whether to correct the viewing angles of the captured images based on whether the images are to be subjected to the image composition.

Although the above-described exemplary embodiment is explained about a digital camera for personal use, the disclosure is also applicable to portable apparatuses, smart phones, and network cameras connected to a server as long as these apparatuses have a composition function.

Image capturing according to the above-described exemplary embodiment can also be implemented with another implementation method. For example, the in-focus position is changed while a moving image is being captured in a moving image format such as the Moving Picture Experts Group-1 (MPEG-1) Audio Layer-4 (MP4) to enable using each frame of the captured moving image equivalently to the images captured with the focus bracketing. Such a method enables obtaining a plurality of images having different in-focus positions with a lower processing load.

According to the above-described exemplary embodiment, similar effects can be obtained by performing processing for displaying images with overlapped frame lines equivalent to the corrected viewing angles, like the portion 1003 in the image 1001, instead of the processing for displaying images after the viewing angle correction.

The disclosure can also be achieved when a program for implementing at least one of the functions according to the above-described exemplary embodiments is supplied to a system or apparatus via a network or storage medium, and at least one processor in a computer of the system or apparatus reads and executes the program. Further, the disclosure can also be achieved by a circuit (for example, an Application Specific Integrated Circuit (ASIC)) for implementing at least one function.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-101954, filed Jun. 24, 2022, which is hereby incorporated by reference herein in its entirety.

What is claimed is:

1. An apparatus comprising:
one or more processors; and
a memory storing instructions which, when executed by the one or more processors, cause the apparatus to function as:
a composition unit configured to perform composition on a plurality of images having different in-focus positions;
a correction unit configured to perform correction on viewing angles of the plurality of images; and
a display unit to configured to display the images of which the viewing angles have been corrected in a case where the correction unit performs the correction,
wherein, in a case where the composition unit performs the composition, the correction unit performs the correction, and
wherein, in a case where the composition unit does not perform the composition, the correction unit does not perform the correction.

2. The apparatus according to claim 1, wherein the correction unit performs the correction by clipping the images.

3. The apparatus according to claim 1, wherein the plurality of images has different in-focus positions in an optical axis direction.

4. The apparatus according to claim 1, wherein the correction unit performs the correction so that the viewing angles of the plurality of images are same as each other.

5. The apparatus according to claim 1, wherein the plurality of images is different in the viewing angle because of a difference in the in-focus position.

6. The apparatus according to claim 1, wherein the display unit simultaneously displays at least some of the plurality of images.

7. The apparatus according to claim 6, wherein the display unit displays one of the plurality of images after simultaneously displaying at least some of the plurality of images.

8. The apparatus according to claim 7, wherein the display unit displays one of the plurality of images in response to a user operation after simultaneously displaying at least some of the plurality of images.

9. The apparatus according to claim 1, wherein the display unit sequentially displays at least some of the plurality of images.

10. The apparatus according to claim 9, wherein the display unit sequentially displays at least some of the plurality of images in response to a user operation.

11. The apparatus according to claim 1, wherein the display unit displays a second image of the plurality of images after displaying a first image of the plurality of image, the first image and the second image being different from each other.

12. The apparatus according to claim 11, wherein the display unit displays the second image in response to a user operation after displaying the first image.

13. The apparatus according to claim 12, wherein, after a user specifies a first region in the first image displayed by the display unit, the display unit displays the second image, and a second region corresponding to the first region of the second image is in focus.

14. The apparatus according to claim 13,
wherein the display unit includes a touch panel, and
wherein the user specifies the first region by using the touch panel.

15. The apparatus according to claim 1, wherein the plurality of images is frames of a moving image.

16. The apparatus according to claim 15, wherein the moving image is a moving picture in a Moving Picture Experts Group-1 (MPEG-1) Audio Layer-4 (MP4) format.

17. The apparatus according to claim 1,
wherein the composition unit generates a composite image through the composition, and
wherein a depth of field of the composite image is greater than a depth of field of any one of the plurality of images.

18. The apparatus according to claim 17, wherein the composition unit performs the composition by using respective in-focus regions of the plurality of images.

19. The apparatus according to claim 18, wherein the composition unit identifies the respective in-focus regions of the plurality of images by using contrast values of the plurality of images.

20. An apparatus comprising:
a sensor configured to capture a plurality of images having different in-focus positions;
one or more processors; and
a memory storing instructions which, when executed by the one or more processors, cause the imaging apparatus to function as:
a composition unit configured to perform composition on the plurality of images;
a correction unit configured to perform correction on viewing angles of the plurality of images; and
a display unit to configured to display the images of which the viewing angles have been corrected in a case where the correction unit performs the correction,
wherein, in a case where the composition unit performs the composition, the correction unit performs the correction, and
wherein, in a case where the composition unit does not perform the composition, the correction unit does not perform the correction.

21. A method comprising:
performing composition on a plurality of images having different in-focus positions;
performing correction on viewing angles of the plurality of images; and
displaying the images of which the viewing angles have been corrected in a case where the correction is performed,
wherein, in a case where the composition is performed, the correction is performed, and
wherein, in a case where the composition is not performed, the correction is not performed.

22. A non-transitory computer-readable storage medium storing a program for executing a method, the method comprising:
performing composition on a plurality of images having different in-focus positions:
performing correction on viewing angles of the plurality of images; and
displaying the images of which the viewing angles have been corrected in a case where the correction is performed,
wherein, in a case where the composition is performed, the correction is performed, and
wherein, in a case where the composition is not performed, the correction is not performed.

* * * * *